UNITED STATES PATENT OFFICE.

PETER C. MAGDLEN, OF NEW YORK, N. Y.

SHAVING-CREAM.

1,090,733.　　　　Specification of Letters Patent.　　Patented Mar. 17, 1914.

No Drawing.　　Application filed March 19, 1913.　Serial No. 755,433.

*To all whom it may concern:*

Be it known that I, PETER C. MAGDLEN, a subject of the Emperor of Austria-Hungary, and a resident of the city of New York, borough of Manhattan, in the county and State of New York, have invented a new and Improved Shaving-Cream, of which the following is a full, clear, and exact description.

This invention relates to an improved cream designed especially for use as a shaving cream or emulsion.

The object in view is to provide a composition adapted to be used on the face in place of the ordinary shaving soap, which will soften the beard and allow the razor to be used in the usual manner while combining with such characteristics the usual characteristics of a good quality of face cream.

In forming the compound, various proportions may be used with good results, but in order to clearly disclose the compound, a desirable proportion is herewith given, namely: 4 ounces of stearin, 23 ounces of water, 1 ounce household ammonia, and 4 ounces liquid petrolatum.

In preparing the compound, the stearin and water are placed in a receptacle and heated until the stearin is melted. After the stearin has melted, one ounce of household ammonia is placed in the mixture of stearin and water, drop by drop, the entire mixture being stirred or beaten in the meanwhile. The ammonia is preferably in a cold state when placed in the mixture, although the same may be previously heated if desired. To the above mixture of stearin, water and ammonia, is added while the same is in a heated condition, four ounces of liquid petrolatum, the same being preferably in a cold condition. The liquid petrolatum is added drop by drop while the entire mixture is being heated and stirred. After the liquid petrolatum has been added, the entire mixture is stirred or beaten until it is a homogeneous smooth mass. Perfumery may be added at this time, if desired, after which the mixture is allowed to cool. It is then ready for use.

Having thus described my invention I claim as new and desire to secure by Letters Patent:—

A shaving cream consisting of stearin, water, ammonia, and liquid petrolatum in substantially the following proportions, four ounces of stearin, twenty-three ounces of water, one ounce of ammonia, and four ounces of liquid petrolatum.

In testimony whereof I have signed my name to this specification in the presence of two subscribing witnesses.

PETER C. MAGDLEN.

Witnesses:
FRANK T. JOHNSON,
VINNIE F. JOHNSON.